Jan. 15, 1924.
H. L. DEMMLER
MOLDING MACHINE
Filed Sept. 6, 1921
1,480,749
6 Sheets-Sheet 3
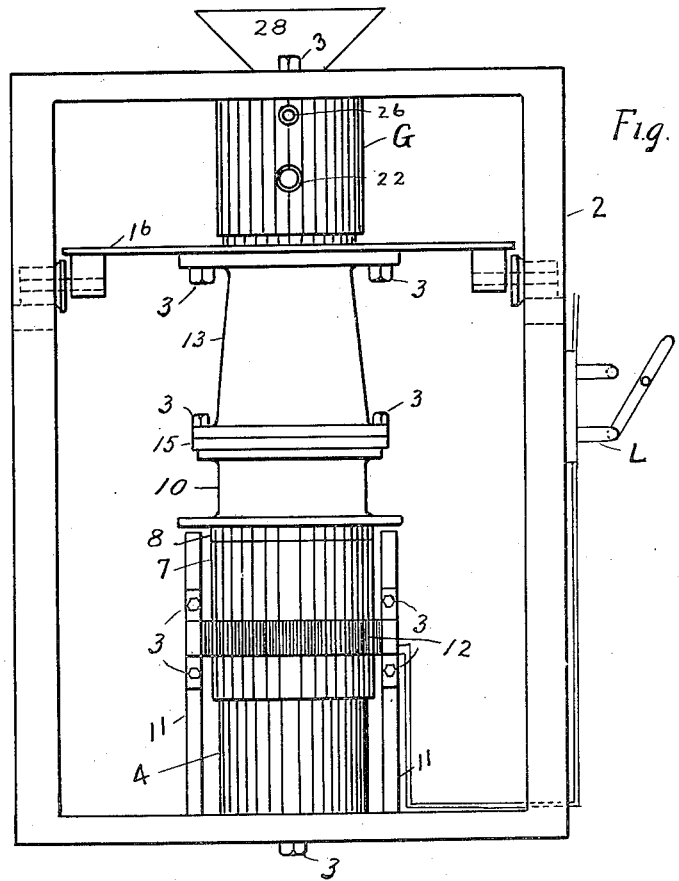
Fig. 3.
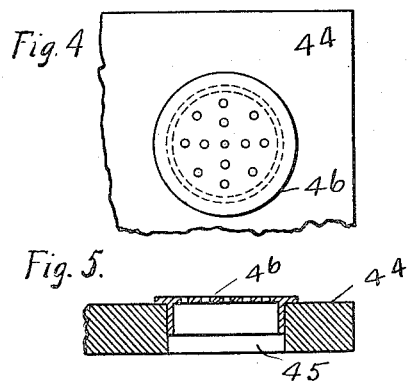
Fig. 4
Fig. 5.
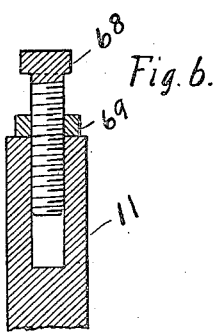
Fig. 6.
INVENTOR.
Henry L. Demmler Jan. 15, 1924.
H. L. DEMMLER
MOLDING MACHINE
Filed Sept. 6, 1921
1,480,749
6 Sheets-Sheet 4
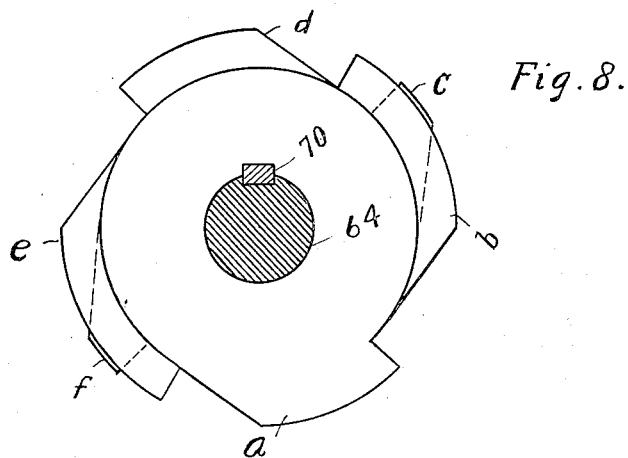
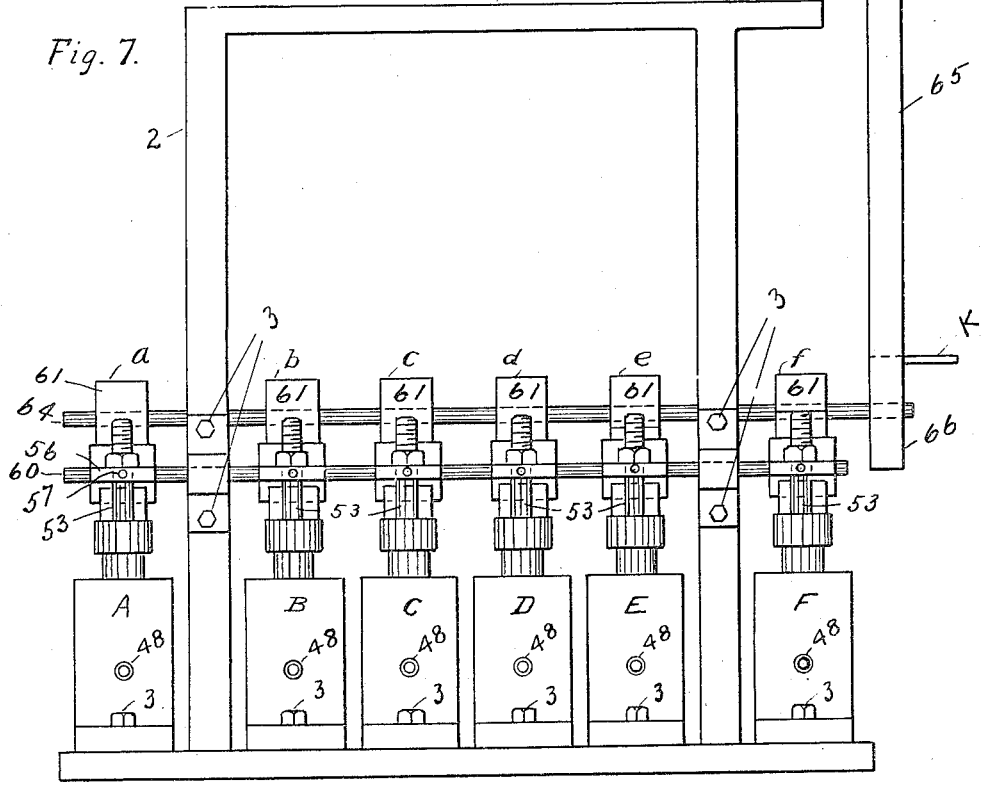
INVENTOR.
Henry L. Demmler Jan. 15, 1924.
H. L. DEMMLER
1,480,749
MOLDING MACHINE
Filed Sept. 6, 1921
6 Sheets-Sheet 5
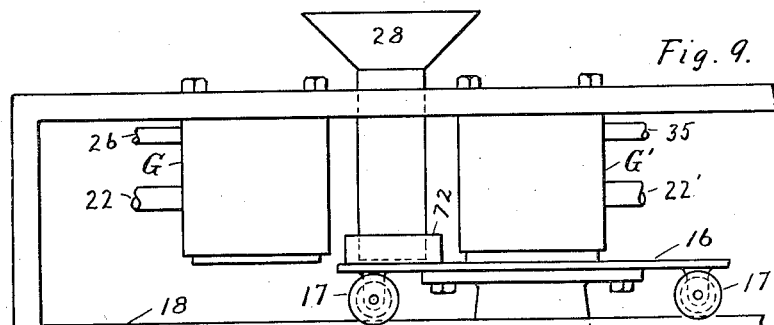
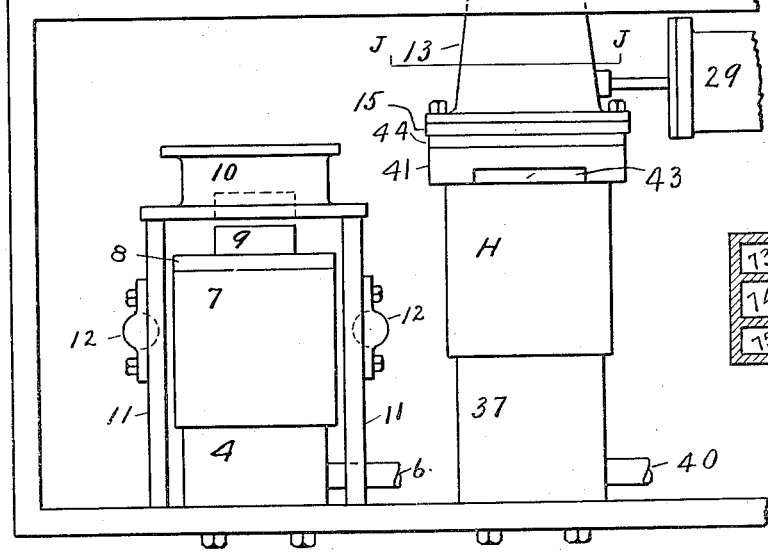
INVENTOR.
Henry L. Demmler Jan. 15, 1924.

H. L. DEMMLER

MOLDING MACHINE

Filed Sept. 6, 1921

INVENTOR.
Henry L. Demmler.

Patented Jan. 15, 1924.

1,480,749

UNITED STATES PATENT OFFICE.

HENRY L. DEMMLER, OF KEWANEE, ILLINOIS.

MOLDING MACHINE.

Application filed September 6, 1921. Serial No. 498,650.

*To all whom it may concern:*

Be it known that I, HENRY L. DEMMLER, a citizen of the United States, residing at Kewanee, in the county of Henry and State of Illinois, have invented certain new and useful Improvements in Molding Machines, of which the following is a full, clear, concise, and exact description, reference being had to the accompanying drawings, forming part of this specification.

The present invention relates to improvements in molding machines in which molds are made by forcing sand into a flask or mold form by compressed air or other gaseous fluid pressure. I have found that if a loose mass of sand is discharged into a flask by fluid pressure a satisfactory mold is not formed. The principal object of the present invention is to provide means for compacting sand in a sand container prior to subjecting the sand to fluid pressure to force the sand into a mold form. Various means may be employed for compacting sand in the container but it may be advantageously accomplished by subjecting the sand to fluid pressure. Other objects of the invention are to provide an automatically operative machine for forming a mold and to provide means for drawing a pattern from the mold accurately.

In the drawings, which illustrate a preferred embodiment of the invention:—

Figure 3 is a front elevation thereof.

Figures 4, 5 and 6 illustrate certain details.

Figure 7 is a rear elevation showing merely the control valves.

Figure 8 is a detail of the valve actuating cams.

Figure 9 is a broken side elevation of the machine with parts in different position than in Figure 1.

Figure 10 is a section on the line J—J in Figure 9.

Figure 14 is a section of an air control valve.

Figure 1:
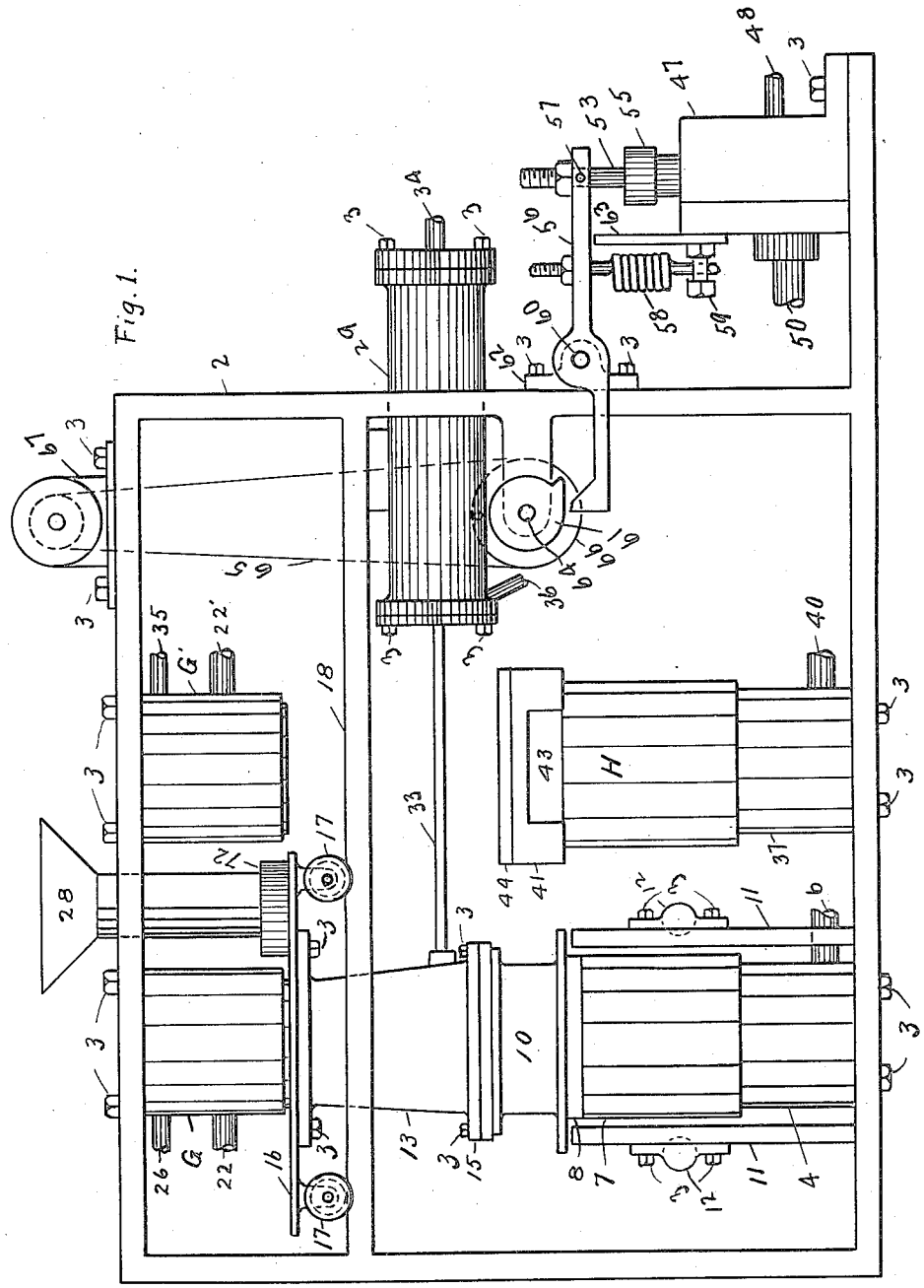
Figure 1 is a side elevation of a molding machine.
Figure 2:
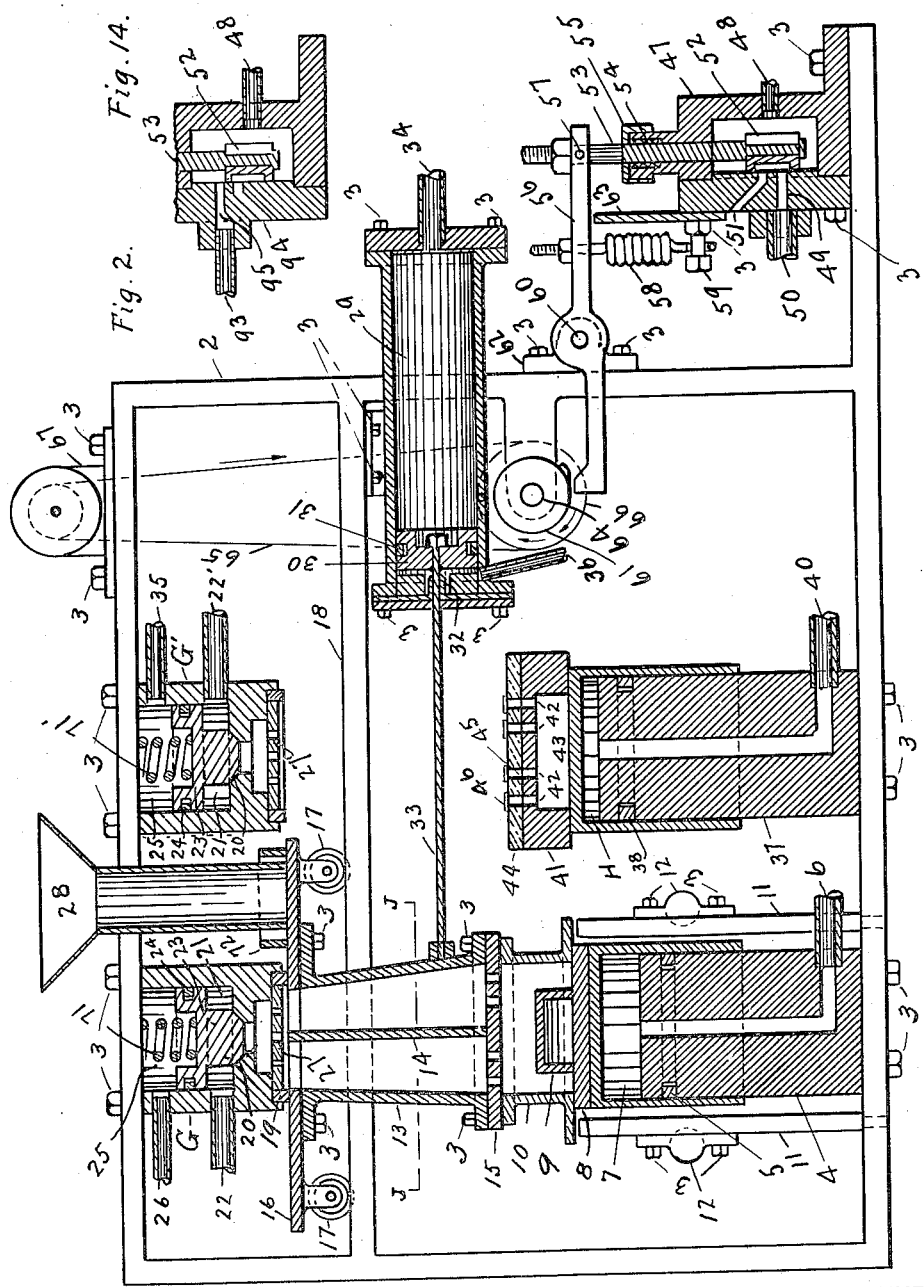
Figure 2 is a vertical section thereof.
Figure 11:
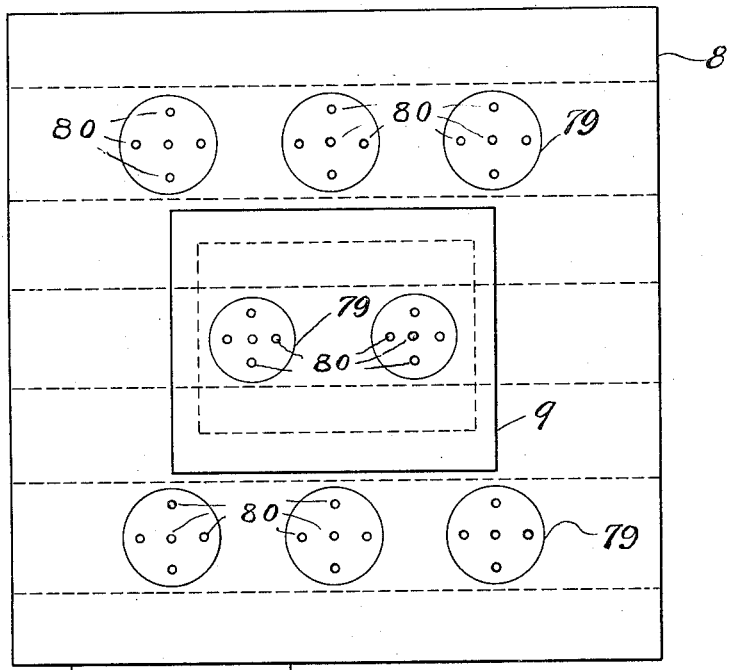
Figure 11 is a top plan of a pattern plate, pattern, and vibrator.
Figure 13:
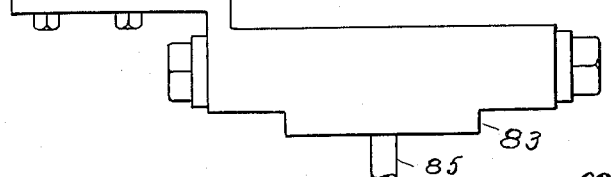
Figure 13 is a horizontal section of the vibrator.
Figure 12:
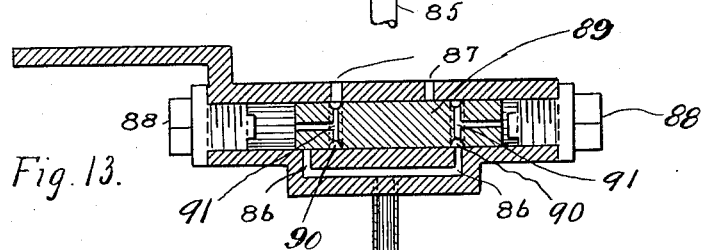
Figure 12 is a vertical section of the pattern plate and pattern.

The machine comprises a frame 2, and various parts of the mechanism are secured thereto or to each other by screws or bolts 3. Referring particularly to Figure 2, a pressure head 4 having packing 5 is formed with a port 6 through which air is admitted and exhausted to control a cylinder 7 vertically slidable on the pressure head 4. The valve mechanism for controlling the admission and exhaust of air through port 6, and the mechanism for controlling the supply and exhaust of air to and from other parts of the machine about to be described, will be described in detail hereafter. A pattern plate 8 carrying a pattern 9 is adapted to be supported on the cylinder 7 and a flask 10 is supported on the pattern plate. The flask is formed with projections by which the flask is supported on posts 11 when the cylinder 7 lowers the pattern plate 8 from the flask withdrawing the pattern 9 from the mold. A magnetic force may be established in posts 11 from magnets 12 by closing the switch L (Figure 3), thus firmly holding the flask on the posts while the pattern plate is vibrated as hereafter described, and lowered. The mold form comprising, in the specific instance illustrated, the pattern plate, pattern and flask is formed with suitably located openings in the molding surface adapted to permit the escape of pressure fluid but to prevent the escape of sand from the form. As illustrated in Figures 11 and 12, these openings are formed by providing the pattern plate and pattern with apertures 81 in which are seated plates or cups 79 formed with relatively minute holes 80. The pattern plate is provided with pins 82 and 92 to center the plate with respect to the cylinder 7 and the flask 10.

Referring again to Figure 2, a sand container 13 is supported from a plate 16 having wheels 17 running on a track 18. The sand container is preferably subdivided by vertical partitions 14 into a plurality of compartments such as 73 to 78 inclusive, shown in Figure 10. The sand container is provided at the bottom with a plate 15 formed with apertures adapted to permit the escape of fluid pressure and of sand when fluid pressure is applied to the container. The sand container is horizontally movable on the track 18 by reciprocation of a piston 30, having packing 31 and 32, in a cylinder 29, the piston being connected with the sand container by a rod 33. The piston is controlled by air admitted and exhausted through pipes 34 and 36.

A pressure head 37 provided with packing 38 is formed with a passage 40 through which air is admitted and exhausted to control the cylinder H vertically slidable on the pressure head 37. A head 41 having a gasket 44 on its upper face, is carried by the cylinder H, the head being formed with a passage 43 to atmosphere, and the head and gasket being formed with apertures 42—45 in which are secured perforated plugs 46. As shown in detail in Figures 4 and 5, the plugs 46 are formed with relatively minute openings. When the sand container 13 is in position over the pressure head 37 the gasket 44 will be clamped against the bottom of the container with the plugs 46 registering with the apertures in the bottom of the container; the holes in the plugs 46 are adapted to permit the escape of pressure fluid but to prevent the escape of sand when fluid pressure is applied to the container.

A valve casing G is disposed above the pressure head 4 and a valve casing G' is disposed above the pressure head 37, a suitable sand supplier or hopper 28 being disposed between the two valve casings. The valve casings are provided with perforated bottom plates 27 and with gaskets 19 adapted to seal against the plate 16, the upper surface of the latter being swept of sand by the guard 72 as the container moves back and forth. The valve casings G and G' and their contained mechanism are similar and comprise, respectively, ports 20 and 20'; valves 23 and 23' having packing 24 and 24' and slidable in chambers 21—25 and 21'—25'. Air is constantly admitted to the lower parts of the respective chambers through pipes 22 and 22', while air is alternately admitted to and exhausted from the upper parts of the chambers through pipes 26 and 35. Springs 71 and 71' assist in seating the valves 23 and 23'.

The flow of air to control the cylinders 7 and H, the piston 30, and the valves 23 and 23', is controlled by generally similar valves. Valve A, in Figure 7, controls pipe 36 and valve D controls pipe 34 to reciprocate the piston 30. Valve B controls pipe 40 to reciprocate the cylinder H and valve E controls the pipe 6 to reciprocate the cylinder 7. Valve C controls pipe 35 leading to valve casing G' and valve F controls pipe 26 leading to valve casing G. The valves A, B, D and E comprise, as shown in Figure 2, a casing 47 with an air supply port 48; a port 49 connected with a pipe 50 adapted to be connected with the pipe or port, such as 6, to be controlled; an exhaust port 51; and a slide valve 52. The valve 52 has a stem 53 extending through packing 54 and adjusting nut 55 and connected with rocker arm 56 by pin 57. The valve is normally held in exhausting position by the spring 58 connected with the arm 56 and projection 59, downward movement of the valve being limited by engagement of the rocker arm by the stop 63. The valve is moved to admit air from the pipe 48 to the pipe 50 by engagement of the forward end of the rocker arm with a cam 61 keyed on a shaft 64 by a key 70. As illustrated in Figure 8, the several cams a, b, c, d, e and f, respectively, control the valves A, B, C, D, E and F. The shaft 64 may be driven by a motor 67 through a belt 65 and a pulley 66, or by other means such as a crank K (Figure 7). The valves C and F, shown in detail in Figure 14, are similar to the valves just described. Each valve has an exhaust port 94 and port 95 connected by a pipe 93 with the pipe 26 or 35 as the case may be. It will be understood that the cams 61 are timed to produce the desired sequence of operations.

After the sand has been forced into the mold form and the cylinder 7 has lowered the flask onto the posts 11 (in the sequence of operations hereafter described), it is desirable to vibrate the pattern as the cylinder continues to descend. For this purpose a valve casing 83 is secured to one side of the pattern plate 8. The casing has removable heads 88, an inlet pipe 85 connected with a source of pressure fluid, branched inlet ports 86 and separated exhaust ports 87. A plunger 89 slides in the casing and is formed with annular grooves 90 with ports 91 extending therefrom through the ends of the plunger. The plunger will be moved back and forth by air admitted alternately to its opposite ends through ports 86, groove 90 and ports 91, the air from the other end of the casing at the same time exhausting through port 91, groove 90 and port 87. The rapid reciprocation of the plunger striking the heads 88 will vibrate the pattern plate to free the pattern from the mold. The posts 11 on which the flask is supported as the pattern plate and pattern are lowered from the mold may be provided with leveling screws 68 and locknuts 69.

In operation (more clearly apparent from Figure 2) the sand container 13 is moved to the right under the hopper 28 and receives a supply of sand. It continues to move to the right into register with the valve casing G', whereupon the cylinder H rises to clamp the gasket 44 against the bottom of the container and the valve 23' opens to admit pressure fluid to the upper end of the sand container. The pressure fluid may escape through the apertures in plugs 46, while the sand will be retained and will be firmly compacted in the container by the pressure. Valve 23' is then closed and the cylinder H lowered, whereupon the container is moved to the left.

Any space that may be left at the top of the container by the compacting of sand therein will be filled with sand as the container passes under the hopper 28. The container continues to move until it is in register with the valve casing G and the cylinder 7. The pattern plate and pattern and flask having previously been placed on the cylinder 7, the cylinder rises until the flask is clamped against the bottom of the sand container. Valve 23 now opens to admit pressure fluid into the top of the sand container and sand is forced through the apertured bottom of the container into the flask. The pressure fluid escapes through the openings in the mold form, such as those in the pattern plate and pattern, while the sand is prevented from escaping and is solidly and firmly packed in the mold form. The valve 23 then closes and the cylinder 7 lowers the flask onto the posts 11 where it is firmly held by the current from the magnets 12. The vibrator now rapidly vibrates the pattern plate and pattern so that they are freed from the mold and are accurately withdrawn, as the cylinder 7 continues to descend, without injuring the mold.

Having thus described my invention, what I claim as new and desire to secure by Letters Patent of the United States is:

1. In a molding machine, the combination of a sand container, means for compacting sand in the container, means for securing a mold form to the container, and means for forcing sand from the container into the form by gaseous fluid pressure.

2. In a molding machine, the combination of a sand container, means for compacting sand in the container by gaseous fluid pressure, means for securing a mold form to the container, and means for forcing sand from the container into the form by gaseous fluid pressure.

3. In a molding machine, the combination of a sand container, means for compacting sand in the container, pneumatically operative means for clamping a mold form to the container, and means for forcing sand from the container into the form by gaseous fluid pressure.

4. In a molding machine, the combination of a sand container, means for compacting sand in the container by gaseous fluid pressure, pneumatically operative means for clamping a mold form to the container, and means for forcing sand from the container into the form by gaseous fluid pressure.

5. In a molding machine, the combination of a sand container, means for compacting sand in the container, a mold form provided with vents adapted to permit the escape of pressure fluid but not of sand from the form, means for securing the form to the container, and means for supplying gaseous fluid pressure to the container to force sand into the form.

6. In a molding machine, the combination of a sand container, means for compacting sand in the container, a mold form provided with a plurality of minute openings in the molding surface communicating with the atmosphere, means for securing the form to the container, and means for supplying gaseous fluid pressure to the container to force sand into the form.

7. In a molding machine, the combination of a sand container, means for compacting sand in the container by gaseous fluid pressure, a mold form provided with vents adapted to permit the escape of pressure fluid but not of sand from the form, means for securing the form to the container, and means for supplying gaseous fluid pressure to the container to force sand into the form.

8. In a molding machine, the combination of a sand container, means for compacting sand in the container by gaseous fluid pressure, a mold form provided with a plurality of minute openings in the molding surface communicating with the atmosphere, means for securing the form to the container, and means for supplying gaseous fluid pressure to the container to force sand into the form.

9. In a molding machine, the combination of a sand container, means for compacting sand in the container, a mold form provided with a plurality of apertures communicating with the atmosphere, plates secured in said apertures constituting part of the molding surface, the plates being provided with a plurality of minute openings, means for securing the form to the container, and means for supplying gaseous fluid pressure to the container to force sand into the form.

10. In a molding machine, the combination of a fluid pressure supply device, a sand container adapted to be connected with said device and provided with openings for the discharge of sand and pressure fluid, and means adapted to permit the escape of pressure fluid but not of sand from the container when the latter is connected with said supply device.

11. In a molding machine, the combination of a first fluid pressure supply device, a second fluid pressure supply device, a sand container adapted to be connected with either of said devices and provided with openings for the discharge of sand and pressure fluid, means adapted to permit the escape of pressure fluid but not of sand from the container when the latter is connected with the first supply device, a mold form provided with vents adapted to permit the escape of pressure fluid but not of sand from the form, and means for securing the form to the container when the latter is connected with the second supply device.

12. In a molding machine, the combination of a first fluid pressure supply device, a second fluid pressure supply device, a sand container open at its top and having an apertured bottom and movable into connection with either of said devices, a plate having apertures adapted to permit the escape of pressure fluid but not of sand, means for clamping the plate against the bottom of the container when the latter is connected with the first supply device, a mold form provided with vents adapted to permit the escape of pressure fluid but not of sand from the form, and means for clamping the form against the bottom of the container when the latter is connected with the second supply device.

13. In a molding machine, the combination of a first fluid pressure supply device, a second fluid pressure supply device, a sand container having an open end adapted to be connected with either device and having an apertured plate at its other end, pneumatically operative means for moving the container, a head pneumatically reciprocable toward and from the first device and adapted to be clamped against the apertured plate of the container, the head having relatively minute openings registering with the apertures, and a mold-form support pneumatically reciprocable toward and from the second device and adapted to clamp a mold-form against the apertured plate of the container.

14. In a molding machine, the combination of a pneumatically operable vertically reciprocable cylinder, a pattern plate carried by the cylinder and adapted to support a flask, means for limiting downward movement of a flask relative to the pattern plate, and means for vibrating the pattern plate.

15. In a molding machine, the combination of a sand container, a pneumatically operable cylinder vertically reciprocable below the container, a pattern plate carried by the cylinder and adapted to support a flask against the bottom of the container, means for forcing sand from the container into a flask by gaseous fluid pressure, means for limiting downward movement of a flask relative to the pattern plate, and means for vibrating the pattern plate.

16. In a molding machine, the combination of a sand container having an outlet, a mold-form provided with a plurality of apertures communicating with the atmosphere, plates secured in said apertures constituting part of the molding surface, the plates being provided with a plurality of minute openings, means for securing the form to the container in register with the outlet, and means for supplying gaseous fluid pressure to the container to force sand into the form.

HENRY L. DEMMLER.

Witnesses:
A. M. BROWNE,
W. D. HOULE.